(12) United States Patent
Yao et al.

(10) Patent No.: US 7,849,128 B2
(45) Date of Patent: Dec. 7, 2010

(54) METHOD FOR THE REAL-TIME DISTRIBUTION OF STREAMING DATA ON A NETWORK

(75) Inventors: Hongyu Yao, San Jose, CA (US); Amol Kekre, Fremont, CA (US); Michael Bennett, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 475 days.

(21) Appl. No.: 11/763,179

(22) Filed: Jun. 14, 2007

(65) Prior Publication Data

US 2007/0288483 A1 Dec. 13, 2007

Related U.S. Application Data

(63) Continuation of application No. 10/132,974, filed on Apr. 25, 2002, now Pat. No. 7,305,483.

(51) Int. Cl.
*G06F 15/16* (2006.01)
(52) U.S. Cl. ........................ 709/202; 709/206; 709/217
(58) Field of Classification Search ......... 709/206–207, 709/217–219, 202
See application file for complete search history.

(56) References Cited

U.S. PATENT DOCUMENTS

| 5,872,921 | A  | * | 2/1999 | Zahariev et al. | ............. | 709/203 |
| 6,557,026 | B1 | * | 4/2003 | Stephens, Jr. | ............... | 709/203 |
| 2003/0005074 | A1 | * | 1/2003 | Herz et al. | .................. | 709/216 |

* cited by examiner

*Primary Examiner*—David Lazaro
(74) *Attorney, Agent, or Firm*—James J. DeCarlo; Greenberg Traurig, LLP

(57) ABSTRACT

A method for sampling of streaming data for distribution on a network (e.g., the Internet) includes receiving the steaming data (which includes periodically updated information items) from a streaming data source. The periodically updated information items of the streaming data are subsequently sampled using a sampling process based on a total update rate of the steaming data ($U_a$) and a capacity of the network (C), thereby creating a sampled data stream. Alternatively, the periodically updated information items of the streaming data can be sampled using a sampling process that is also based on the importance ($K_{qmin}$) of each of the periodically updated information items and the update rate ($U_q$) of each of the periodically updated information items to create the sampled data stream. The sampled data stream is then distributed on the network (e.g., the Internet or a private area network).

24 Claims, 4 Drawing Sheets

METHOD FOR THE REAL-TIME DISTRIBUTION OF STREAMING DATA ON A NETWORK

This application is a continuation of prior U.S. application Ser. No. 10/132,974, filed Apr. 25, 2002 now U.S. Pat. No. 7,305,483.

BACKGROUND OF THE INVENTION

1. Field of the Invention

The present invention relates, in general, to methods for real-time distribution of changing data and, in particular, to methods for sampling streaming data for real-time distribution on a network.

2. Description of the Related Art

Many data sources provide their subscribers with large volumes of time sensitive content using high speed streaming data in one or more media Such steaming data might include stock quotes, other financial quotes, news bulletins, real-time weather reports or other information items. Some streaming data might also include special purpose information items, such as real-time updates to locations of objects in a position tracking system. In the general case, a data source provides one or more types of streaming media content representing information provided by that data source, where the streaming media content might represent, at least in part, a stream of updates about that information. The media can be streaming media as is narrowly defined in some contexts to be a continuous flow without a set ending point, but as used herein simply refers to data that is supplied as a flow, not necessarily continuous, that does not necessarily have a defined end and cannot be entirely obtained ahead of time. Thus, updates to one datum that is updated only once very few hours might still be treated as a stream of data.

The distribution network used to transmit the information from the data source to the users of the information often has a limited capacity (e.g., bandwidth-limited channels) that might prevent every user from getting every bit of the data provided from the data source. For example, quote data just from transactions of one stock exchange might comprise thousands of quotes, changing many times per minute, resulting in a multi-megabyte per second steam. Often, many portions of the distribution network cannot provide the bandwidth to pass that stream for real-time updates to the information. For example, if the network spans a continent, connects continents (such as North America and Asia), connects countries (such as the United States and India) or links within a poorly developed geographic region, bandwidth in some portions of the network might be extremely limited or too costly to fully exploit. Attempts to directly distribute streaming data on a wide area network can overwhelm the wide area network, resulting in a degradation of the quality (e.g., the representative nature and relevance) and timeliness of the distribution. For example, if quote data, updated once per minute, were delayed by ten minutes due to network congestion, the usefulness of the data stream would be seriously degraded.

Another problem with typical bandwidth-limited networks is that their capacity changes over time, resulting in a dynamic environment that needs to be considered. Such a dynamic environment further complicates efforts to distribute streaming data on a network.

Still needed in the field, therefore, is a method for distributing streaming data on a network that does not overwhelm networks of limited capacity, yet provides a timely and high quality distribution of periodically updated information items, in relatively static environments and dynamic environments.

SUMMARY OF THE INVENTION

The present invention provides a method for the sampling of streaming data for real-time distribution on a network that does not overwhelm the network, yet distributes a high quality sampled data stream that is derived from the streaming data in a timely manner. The method also provides for the timely and high quality distribution of a sampled data steam in a dynamic environment.

An embodiment of a method for sampling streaming data, including periodically updated information items for distribution on a network according to the present invention includes first receiving the streaming data from a streaming data source. The information items might include stock quotes, other quotes, new items, weather information, positional information, and/or other changing information items. The periodically updated information items of the streaming data are subsequently sampled at a rate that is based on the update rate of the steaming data and a capacity of the network to create a sampled data stream. The sampling rate and algorithm for determining sampling might vary from stream to stream and might be based on the relative importance of each of the periodically updated information items and the update rate of each of the periodically updated information items. The sampled data stream is then distributed on the network. The network can be a private network, a virtual private network, the Internet, an extranet intranet, a wide area network (WAN) or the like.

One advantage of embodiments of the present invention is that the information can be distributed in a timely manner and be of high quality (i.e., well representative of the streaming data and of high relevance), since the received streaming data is sampled based on characteristics of the environment in which the steaming is occurring and, optionally, on factors representing the importance of each of the periodically updated information items and the like.

Methods according to the present invention, therefore, enable the distribution of streaming data on rate-limited networks. The parameters used for the processes of sampling can be dynamically determined, thus adjusting sampling rates to accommodate a dynamic environment. The environment in which the streaming and sampling is occurring might change due to changing network loads, changing computational resource availability, or the like.

A better understanding of the features and advantages of the present invention will be obtained by reference to the following detailed description that sets forth illustrative embodiments and the accompanying drawings.

DETAILED DESCRIPTION OF THE INVENTION

Figure 1:
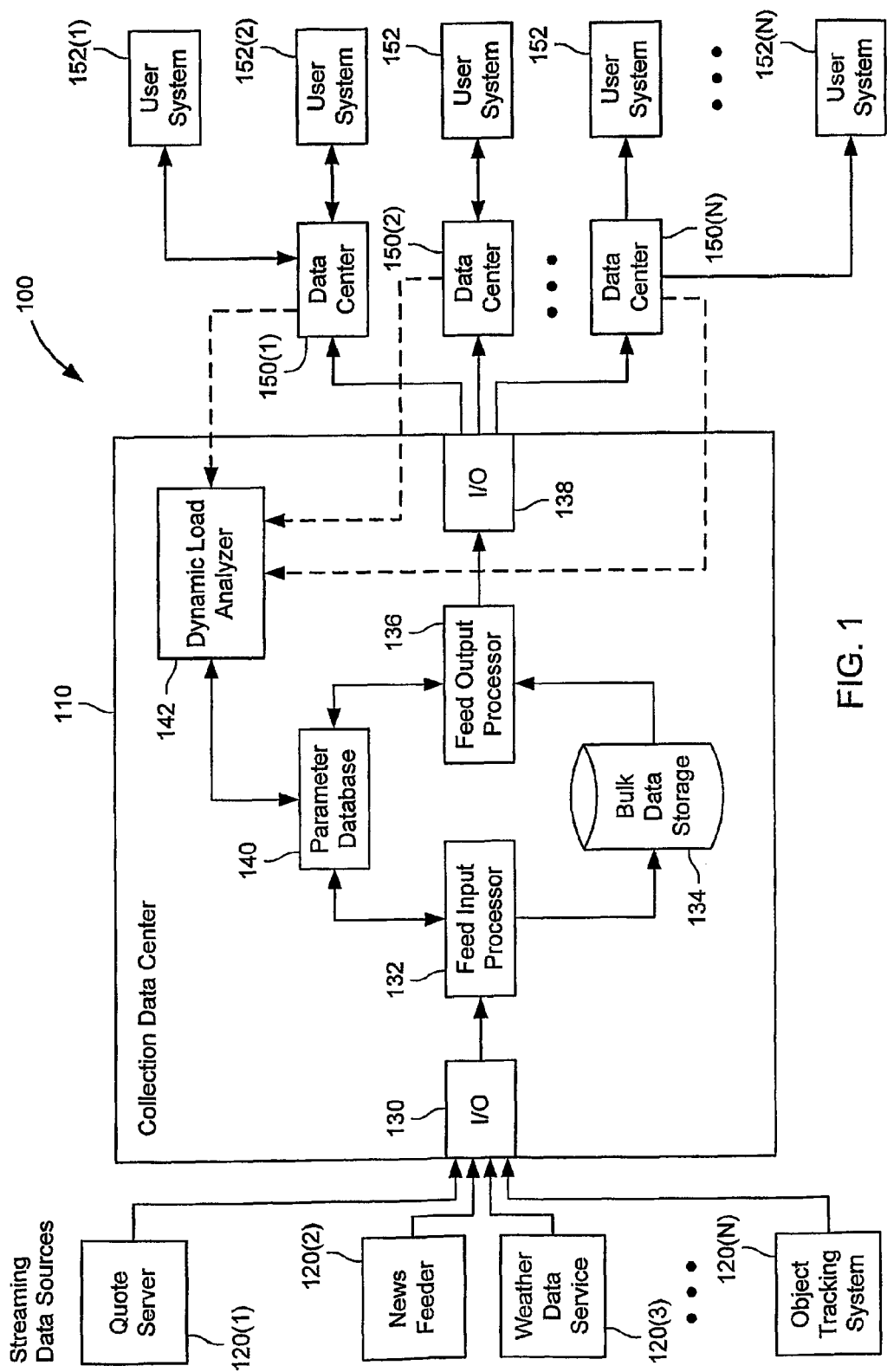
FIG. 1 is a block diagram of a network system wherein embodiments of the present invention might be used.

FIG. 1 is a block diagram of a networking system 100 wherein embodiments of the present invention might be used. As shown there, a collection data center 110 receives streams of data from various streaming data sources 120. Collection data center 110 includes input/output control (I/O) 130 to receive the data streams and provide them to a feed input processor 132. Feed input processor 132 is coupled to a data storage 134 for storing the data, which is read by feed output processor 136 and sent to I/O 138 to be transmitted to various data centers 150 according to parameters stored in a parameter database 140. Data storage 134 might be a magnetic storage device, but in a typical implementation, it is short-term, fast memory used to buffer data streaming between the feed input processor and the feed output processor. User systems 152 connect to respective data centers 150 to receive the information items. In the figure, elements are labeled to indicate multiple instances of like objects. For example, the data sources are labeled 120(1), 120(2), . . . , 120 and the user systems are labeled 152(1), 152(2), . . . , 152(M).

In a specific example, a provider of New York Stock Exchange (NYSE) transactions might stream quotes and quote updates to a collection data center operated by Yahoo!. That collection data center then processes the steam, along with others, for distribution to Yahoo! data centers around the world, through network links of varying capacity. A Yahoo! user might then direct the user's computer system (PC, laptop, wireless device, telephone, or the like) to connect to a Yahoo! data center (usually the most easily accessed or closest data center, but that is not required) to obtain current quotes.

Collection data center 110 also includes a dynamic load analyzer 142 that determines load factors for the distribution networks between collection data center 110 and data centers 150. Such load factors are considered in updating parameters in parameter database 140 that, as described in more detail below, are used to determine how the bulk data is sampled and/or processed by feed output processor 136.

Parameter database 140 maintains a number of tables containing a number of records of parameters used for processing the streams. Some of the parameters are shown in the following tables that are illustrative of the databases and/or data tables that might be used in a collection data center.

Table 1 lists parameters associated with a data center. Where a collection center receives and distributes data steams to multiple data centers, multiple instances of such data center parameter table might be present. In some implementations, the correspondence is one-to-one, whereas in others, some data centers receive distributions unrelated to parameters from parameter database 140. For example, if the connection between the collection center and the data center has enough bandwidth, all the data from all the received streams might be forwarded to that data center without needing to consult parameters in a parameter table for that data center. Some of the parameters accumulate over an "SSU" interval, which is the time between System Statistics Updates.

Table 2 (an "item" table) lists parameters associated with information items. A given information item, q, is something that can be updated, such as the current quote for ticker symbol YHOO, or the weather in Sunnyvale, Calif. Some item entries in the item table might be for single items, such as quotes for YHOO, but other item entries in the item table might be for groups of related or unrelated items that can be updated, such as the weather for 20 counties in California, a miscellaneous collection of items not having a common characteristic or some set that is only partially related. By way of example, high volume items might be treated as individual items white a group of low volume items might be grouped as one "item" in the table. It should be understood that "information item" as used herein can refer to a group of one item or a group of more than one item. In some embodiments, all items might each have their own group, in some embodiments some items have their own groups, and in others all items might be grouped into groups having more than one item therein, as items are generally considered. In the general case, zero or more groups comprise single information items and zero or more groups comprise more than one information item.

In some oases, a given information item never gets updated, such as a news article on a specific incident, but more commonly, the information item is updated. Other examples of information items is a set of objects, such as the set of current commentary articles on a particular company, the set of weather reports for different areas of a country or a set of low-traffic stock quotes. While the set might comprise individual and more or less related or unrelated items, they can be grouped together for handling at the collection data center. The information items that never get updated need not be treated as a special case, but could just be treated as items that get updated only after some arbitrarily long period has passed.

Parameter database 140 might also maintain tables associated with streams (data sources), such as Table 3. Where a collection center receives and distributes data streams to multiple streams, multiple instances of such a stream parameter table might be present. In some implementations, the correspondence is one-to-one, whereas in others, some streams are received by the collection center but are-not processed using parameters from parameter database 140. For example, the volume of data from a weather data source is often so many degrees of magnitude less than the volume from a financial data source that all received weather data might be passed through the collection center without processing and not significantly affect congestion to the data centers. In some situations, with more than one large data source, some balancing can be done among data sources.

Parameter database 140 might be arranged as a conventional database, but with high responsiveness. Typically, parameter database 140 maintains one item table per item per data center. If one or more data stream is divided into many information items, q, then the number of item tables might be quite large. However, if the database is efficiently indexed, such as through the use of hashing, millions of item tables might be accommodated. In some implementations, parameter database 140 is largely or entirely stored in fast memory so it can be accessed quickly. Parameter database 140 could be updated in real-time, by dynamic load analyzer 142 or other process, allowing for real-time adjustment of sampling rates to cope with dynamic environments, such as networks with varying capacity or other effects on throughput.

TABLE 1

Per Data Center Parameters

| Parameter | Units | Description |
|---|---|---|
| $T_0$ | seconds | Time of Initial Start |
| $T$ | seconds | Current Time |
| $T_u$ | seconds | Time of Last System Statistics Update (SSU) |
| $I_u$ | seconds | SSU interval |
| $I_s$ | seconds | Sweeping Phase Interval |
| $I_p$ | seconds | Time interval to initialize system statistics if required |

TABLE 1-continued

Per Data Center Parameters

| Parameter | Units | Description |
|---|---|---|
| $I_m$ | seconds | Maximum non-active period used in sweep phase |
| $N_{su}$ | bytes | Data Distributed in All Prior Intervals $[T_0, T_u]$ |
| $N_s$ | bytes | Data Put in Distribution Queue in Current Interval $[T_u, T]$ |
| $N_{du}$ | bytes | Data Remaining in Distribution Queue at $T_u$ |
| $N_d$ | bytes | Data Remaining in Distribution Queue at T |
| $U_a$ | bytes/sec | Update Rate, calculated from $U_a = N_a/(T - T_u)$ over all sources (Total Update Rate) |
| C | bytes/sec | Network Capacity Calculated for Current SSU Interval as $C = (N_s + N_{du} - N_d)/(T - T_u)$ |
| $C_p$ | bytes/sec | Network Capacity from Previous SSU Interval |

TABLE 2

Per Information Item/Group Parameters

| Parameter | Units | Description |
|---|---|---|
| $t_q$ | seconds | Time Last Sample Placed on Distribution Queue |
| $n_{qa}$ | bytes | Update Data Received in All Prior Intervals $[T_0, T]$ |
| $n_q$ | bytes | Update Data Received in Current Interval $[T_u, T]$ |
| $u_q$ | bytes/sec | Update Rate, calculated as $u_q = n_q/(T - T_u)$ |
| $s_{qa}$ | bytes | Sample Data Put on Distribution Queue in All Intervals $[T_0, T]$ |
| $s_q$ | bytes | Sample Data Put on Distribution Queue from $T_u$ to T |
| $r_q$ | bytes/sec | Sampling Rate, calculated as $r_q = s_q/(T - T_u)$ |
| $K_{qmin}$ | bytes/sec | Minimum Sampling Rate |
| $K_{qmax}$ | bytes/sec | Maximum Sampling Rate |
| $f_q$ | boolean | Distribution Queue Indicator |

TABLE 3

Per Data Source Parameters

| Parameter | Units | Description |
|---|---|---|
| $N_u$ | bytes | Data Received from Sources in All Prior Intervals $[T_0, T_u]$ |
| $N_a$ | bytes | Data Received from Sources in Current Interval $[T_u, T]$ |

The Initial Start Time may be reset each time the process resets. The Minimum Sampling Rate, $K_{qmin}$, for a given information item q represents the importance of q. An initial value for $K_{qmin}$ can, for example, be obtained from a configuration file and need not be fixed, but might be updated each SSU phase (described below) as follows:

$$K_{qmin}(\text{new}) = K_{qmin}(\text{old}) * C/C_p, \text{ if } C_p <> 0$$

$$K_{qmin}(\text{new}) = K_{qmin}(\text{old}), \text{ if } C_p = 0$$

where the information item's update rate, $U_q$, is less than its $K_{qmin}$ value, the sampling does not need to be at least $K_{qmin}$, but can be set to the lower update rate. The Maximum Sampling Rate, $K_{qmax}$, for a given item q and a given data center is calculated as:

$$K_{qmax} = U_q, \text{ if } U_a = 0$$

$$K_{qmax} = U_q/U_a * C, \text{ if } U_a <> 0$$

The Distribution Queue Indicator, $f_q$, indicates whether or not a received data update will be put on the distribution queue. If the received update is not put on the queue, $f_q$ will be set. If a data update is put on the queue, $f_q$ will be cleared.

It should be understood that while certain units are used in these tables for time (seconds), data quantity (bytes) and data rates (bytes/second), other units can be used without departing from the scope of the invention.

It should be also understood that the term "sampling rate" is not limited to some fixed data transmission rate determined based on calculations, but more generally refers to the rate of transmission that might exist if the sampling processes described herein are applied to a data stream. It is entirely possible that the numerical value of the sampling rate, or other rates, is not known until all the inputs to the sampling process are known, such as the dynamically determined values. In the most general case, the sampling rate might not be an independent variable that would be set or adjusted, by might be dependent and determined by the outcome of setting other variables and applying the sampling process to the data being sampled. Nonetheless, whether the sampling rate is determined by the setting of a "sampling rate" variable or as a byproduct of the sampling process, the data can be said to have a sampling rate.

Figure 2:
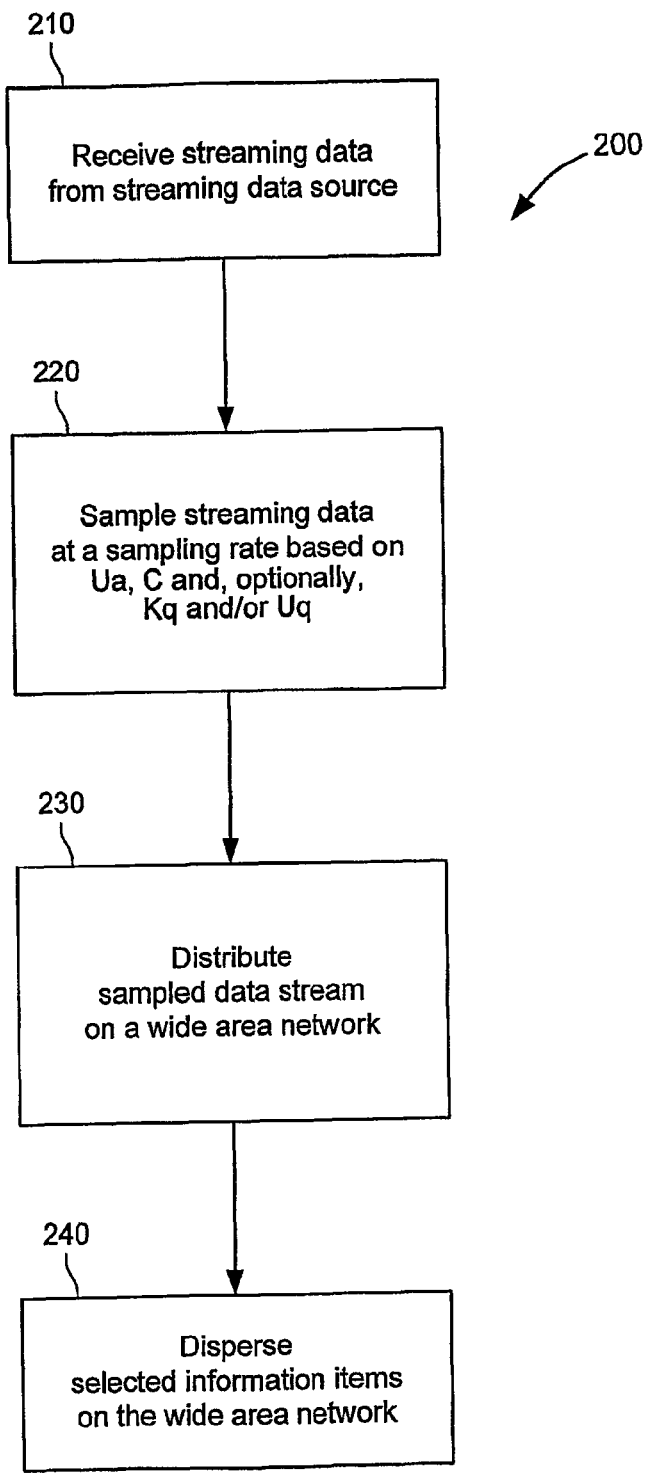
FIG. 2 is a flow diagram illustrating a sequence of steps in a process according to one exemplary embodiment of the present invention.

FIG. 2 is a flow diagram illustrating a sequence of steps in a process 200 for sampling streaming data, which includes periodically updated information items, for distribution over a wide area network (e.g., the Internet) in accordance with one embodiment of the present invention. The periodically updated information items of the streaming data can be any type of information items including, but not limited to, stock or other financial quotes, news items (e.g., sports scores or financial news items), business or financial information, weather information or other types of periodically updated information items such as air traffic tracking information items or global positioning system (GPS) information items. In addition, the periodic update rate of each of the periodically updated information items can be different from or identical to the periodic update rate of other information item(s) of the streaming data. As described above, information items might be grouped and the groups treated as described herein for items.

The network can be any type of suitable network including a public network, a private network, the Internet (i.e., a global internetwork or networks), an Intranet, an Extranet, a virtual private network (VPN), a non-TCP/IP network or a wireless network. One skilled in the art will recognize that the capacity of such networks can be limited in comparison to the streaming data. For example, the streaming data may be provided at a rate of 1 megabytes/second (s), while the capacity of the network may be only 20-50 kilobytes per second (KBs). In this respect, the limited capacity of the network requires that the streaming data be distributed in a rate-limited manner.

The streaming data is received from a streaming data source, as set forth in step 210. The streaming data source can be a stock exchange, business, or financial information streaming data source, and the periodically updated information items can be financial quotes (e.g., index quotes or individual stock quotes).

Subsequently, the periodically updated information items of the streaming data are sampled at a sampling rate that is based on a total update rate ($U_a$) of the streaming data and a capacity (C) of the network, as set forth in step 220. In other words, the sampling rate is calculated as a function of $U_a$ and C. The sampling of the periodically updated information items of the streaming data creates a sampled data steam that is essentially a subset of the received streaming data. In a changing environment, $U_a$ and C can be dynamically determined at a rate of, for example, at least every one or two minutes using conventional methods known to one skilled in the art. In that circumstance, since the sampling rate is based on a dynamically determined $U_a$ and C, the sampling rate itself is being dynamically adjusted in response to changes in $U_a$ and C.

In a specific example, worldwide financial quote data is collected from over fifty stock exchanges around the world and distributed from a collection center (such as Yahoo!'s California data center) to a plurality of data centers (such as Yahoo!'s data centers around the world). In this example, the typical value of $U_a$ would range from a few KBs to over 1 MBs at peak time times. The bandwidth from the collection center in California to a data center on the East Coast of the U.S. might range from 100 KBs to 400 KBs, while the bandwidth from the collection center to data centers in India or China might typically range from 10 KBs to 80 KBs. Sampling rates for each data center would be dynamically adjusted to match the network bandwidth from the collection center to those data centers.

The relevancy of the sampled data stream can be increased by sampling the periodically updated information items of the steaming data based on a factor ($K_{qmin}$) that represents the "importance" of each of the periodically updated information items and/or the individual update rate ($U_q$) of each periodically updated information item. A $K_{qmin}$ for each of the periodically updated information items can be predetermined based on prior experience (e.g., by determining which periodically updated information items have been frequently accessed or are deemed more popular by which users using which data centers). As an example, where the periodically updated information items for U.S.-based data centers are financial quotes, the $K_{qmin}$ for frequently accessed NYSE quotes can be greater than the $K_{qmin}$ for infrequently accessed quotes of other countries' stock exchanges. As with other parameters described herein, $K_{qmin}$ might relate to a single information item, such as the current quote for a specific company, or to a group of items, such as the current quotes for several variations of a specific company's securities, or unrelated items, where the group of items is treated as one item at least when determining parameters such as $K_{qmin}$ to apply to a sampling process.

$K_{qmin}$ is the minimum rate at which streaming data will be sent if the update rate for that information item is at least that rate, without considering the network bandwidth. Once apprised of the current disclosure, one skilled in the art will recognize that the $K_{qmin}$ value for the periodically updated information items can depend on the data center to which the sample data stream will be distributed. For example, if the data center serves primarily users in India, Indian financial quotes may be of more importance than Chinese financial quotes. However, if the data center serves primarily users in China, Chinese financial quotes can be of greater importance than Indian financial quotes. However, financial quotes from the NYSE and NASDAQ, for example, can be of high importance regardless of the geographic region covered by the data center.

A typical user of the data center might be an individual who accesses a web site or web page from a web server that constructs the site or page from data obtained from that data center. For example, the user might be a Yahoo! user using a Web browser or other Internet client to access a My Yahoo! web page containing news, quotes and other information.

To accommodate a changing environment, the sampling rate can be based on dynamically determined $U_a$, C, $K_{qmin}$, and $U_q$ values, to allow the sampled data stream to be distributed in a timely fashion without overwhelming the network, and with a sampling rate that is dynamically adjusted to accommodate changes in the environment. Furthermore, the sampling rate can be individually adjusted for each periodically updated information item, thus accurately sampling periodically updated information items with different update rates in a representative manner.

As an example, during peak market times, $U_a$ is about 1 MBs, while the available network bandwidth, C, is about 200 KBs to the East Coast data center and 40 KBs to the India data center. For indices such as Dow Jones Industrial Average or the NASDAQ Index, the collection center receives those streams with an update rate, $U_q$, of 400 bytes/sec. The collection center might receive each individual stock quote with an update rate, $U_q$, of 100 to 400 bytes/sec per stock symbol (such as IBM or YHOO), while less commonly traded stocks might have update rates of only a few bytes per second.

For the East Coast data center, $K_{qmin}$ might be 200 bytes/sec for NYSE, NASDAQ indices (i.e., sending, on average, every other sample received), $K_{qmin}$ might be from 40 to 100 bytes/sec for some individual NYSE, NASDAQ or AMEX stock quotes (such as IBM or YHOO) and $K_{qmin}$ might be 10 to 40 bytes/sec for all other stock quotes. For some infrequently changing ticker symbols, the sample rate might be lower that $K_{qmin}$ when the ticker symbol's update rate is less than $K_{qmin}$.

For the India data center, $K_{qmin}$ might also be 200 bytes/sec for NYSE, NASDAQ indices, but $K_{qmin}$ might be from 40 to 200 bytes/sec for some Indian stock quotes received at the collection center with an update rate of 40 to 400 bytes/sec.

The sampled data stream is distributed on the network, as set forth in step 230. The distribution of the sampled data steam can be accomplished using conventional methods such as TCP/IP transport.

Depending on $U_a$, C, and, optionally $K_{qmin}$ and/or $U_q$, periodically updated information items that are rarely updated may be sampled for distribution on the network at a rate that could be considered insufficient. In that circumstance, such rarely updated information items can be selected for dispersion on the network, as set forth in step 240. This dispersion of selected periodically updated information items (e.g., information items that are rarely updated) is referred to as a "SWEEP" step (or phase) below.

Figure 3:
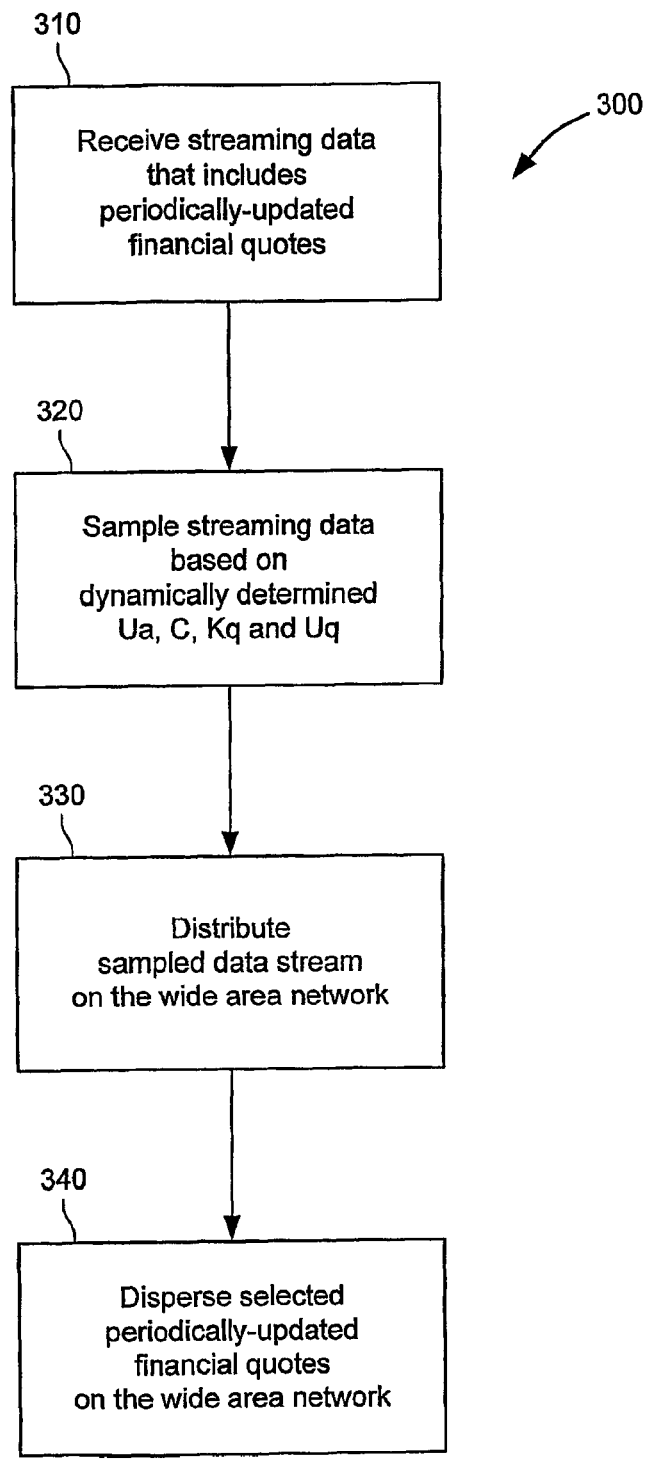
FIG. 3 is a flow diagram illustrating a sequence of steps in a process according to another exemplary embodiment of the present invention.

FIG. 3 is a flow diagram illustrating a sequence of steps in a process 300 for sampling streaming data, which include periodically updated financial quotes, for distribution over the Internet in accordance with the present invention. Process 300 includes receiving the streaming data from a streaming data source, as set forth in step 310.

Subsequently, as set forth in step 320, each of the periodically updated financial quotes of the streaming data is sampled using a sampling rate based on a dynamically determined total update rate of the streaming data ($U_a$), a dynamically determined capacity of the network (C), a predetermined importance ($K_{qmin}$) of each of the periodically updated information items and a dynamically determined update rate ($U_q$) of each of the periodically updated information items.

The sampling of the periodically updated financial quotes creates a sampled data stream, as set forth in step 320. The sampled data stream is then distributed on the Internet, as set forth in step 330. In process 300, selected periodically updated financial quotes (e.g., financial quotes that have been rely-updated in the streaming data) are also dispersed on the network (see step 340).

Figure 4:
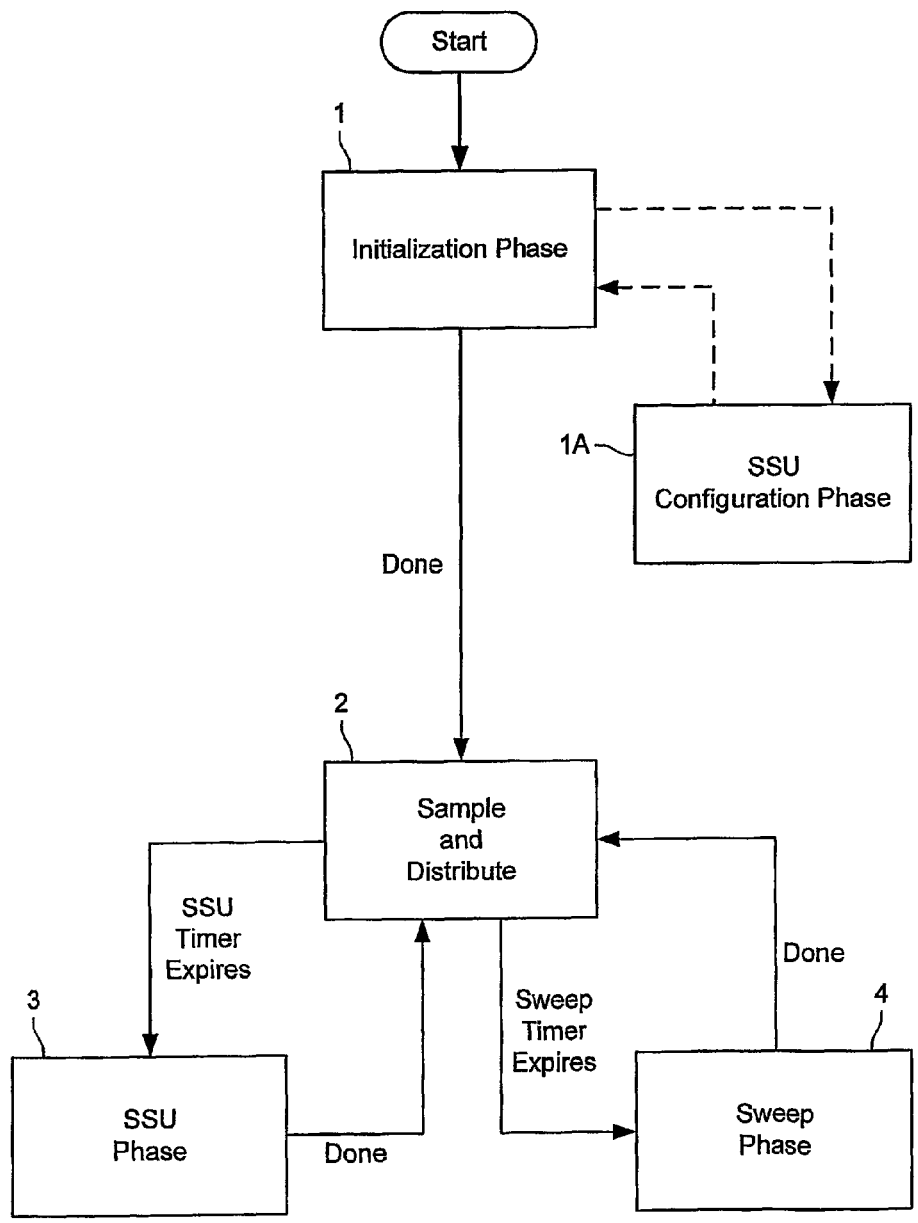
FIG. 4 is a flow diagram illustrating various phases of a sampling and distribution process.

FIG. 4 is a flow diagram illustrating various phases of a process to accomplish the sampling, distribution and dispersing steps described above. As shown there, the process begins with an initialization phase (phase 1), typically triggered by a server being initialized or other reason for starting the process. The time of starting this process (or just when this phase is complete) is referred to herein as the "method starting time". In phase 1, the in-memory database is initialized, necessary system and quote statistics are calculated, and a start timer for an SSU phase and SWEEP phase (each of which is described in detail below) are initiated as follows. In particular, the in-memory database and $T_0$ are initialized and values for $I_u$, $I_s$, $I_p$, $I_m$ and $K_{qmin}$ are obtained from a configuration file.

The values for $T_u$, $N_u$, $N_a$, $U_a$, $N_{su}$, $N_{du}$, $N_s$, $N_d$, C, $C_p$, $t_0$, $n_{qa}$, $n_q$, $U_q$, $s_{qa}$, $s_q$,$r_q$, $K_{qmax}$ and $f_q$ can be obtained from a configuration file. Alternatively, the process can include an additional phase (phase 1A) wherein all received streaming data is placed in the distribution queue without sampling for a time period of $I_p$ and that process is monitored to determine suitable values for those variables that are not obtained from the configuration file.

Also in phase 1, an SSU phase timer and a sweep phase timer are started (explained below). The timer intervals are $I_u$ and $I_s$, respectively. In this phase, the process includes starting the necessary threads to continuously get data from the distribution queue and send it out to the network and update system statistics $N_{su}$, $N_{du}$, $N_s$ and $N_d$ as needed.

In Phase 2, the streaming data are sampled and the sampled data stream is distributed over the network. The activity in this phase might be triggered by the receipt of periodically updated information items, such as an update to a financial quote. In this phase, the received streaming data are sampled as follows:

1. Obtain current system time T.
2. Overwrite existing data with a received periodically updated financial quote update, set $f_q$.
3. Calculate $U_q$. If $U_q <= K_{qmin}$, put the periodically updated financial quote update on the distribution queue, set $t_q=T$, clear $f_q$, and go to step 5 of Phase 2. Otherwise, continue to step 4 of Phase 2.
4. Calculate $K_{qmin}$, if $U_q <= K_{qmin}$, put the periodically updated financial quote update on the distribution queue, set $t_q=T$, clear $f_q$.
5. Update other quote statistics (i.e., $n_q$, $s_q$, $n_{qa}$, $s_{qa}$) and system variables ($N_a$, $N_s$).

Phase 3 (referred to as the "SSU phase") is triggered by expiration of the SSU timer. In this phase, several method and financial quote statistics are dynamically determined (either calculated or determined using conventional network and environment monitoring techniques) or dynamically updated as follows. Specifically, the calculated or determined quantities include C, and possibly $K_{qmin}$. The updated values include CP, $T_u$, $N_u$, $N_{su}$, $N_{du}$. Then the SSU timer is reset and the phase changes to Phase 2.

Phase 4 (referred to as the "SWEEP phase") is triggered by a sweep timer in this phase, the in-memory database is scanned and any periodically updated financial quotes that have been updated in the streaming data but not yet distributed on the Internet during the last time duration denoted by $I_m$ will be distributed. The financial quotes and other information items that meet this criteria are referred to as "selected periodically updated financial quotes". In this phase, the current system time T is obtained, the in-memory database is scanned and periodically updated financial quotes are retrieved. Then, for each quote where $T-t_q >= I_m$ and $f_q$ is set, the financial quote is distributed and $f_q$ cleared. Then the sweep timer is reset and the phase changes to Phase 2.

Methods according to the present invention can be efficiently implemented via software and hardware, for example, a modular C/C++ programming language library on a FreeBSD operating system with an in-memory database. However, one skilled in the art will recognize that other programming languages (such as Java, Perl, Visual Basic, and Pascal) and any other operating systems (such as Windows, Solaris, and Linux) can be utilized to implement the present invention.

It should be understood that various alternatives to the embodiments of the invention described herein may be employed in practicing the invention. It is intended that the following claims define the scope of the invention and that methods within the scope of these claims and their equivalents be covered thereby.

The invention claimed is:

1. A method comprising:
   receiving, by at least one processor, streaming data comprising periodically-updated information items from a streaming data source;
   sampling, by the at least one processor, the received streaming data using a sampling process to select which of the information items from the received streaming data to distribute based on update rates of the information items and on a capacity of a network into which the data is to be distributed, the sampling process selecting periodic updates of the information items to create a sampled data stream comprising the selected periodic updates of the information items, for each information item, the sampling process determines at least one sampling rate threshold using the capacity of the network and selects a periodic update of the information item in accordance with the at least one sampling rate threshold; and
   distributing, by the at least one processor, the sampled data stream on the network.

2. The method of claim 1 further comprising, wherein the update rates and the capacity of the network are dynamically-determined.

3. The method of claim 1, wherein the sampling step samples each of the periodically-updated information items of the streaming data using a sampling process that is also based on a predetermined importance of each of the periodically-updated information items to create the sampled data stream.

4. The method of claim 3, wherein the sampling step samples each of the periodically-updated information items of the streaming data using a sampling process that is also based on an update rate of each of the periodically-updated information items to create the sampled data stream.

5. The method of claim 1, further comprising using, during the sampling step, a sampling process that is also based on a dynamically-determined total update rate of the information items in the streaming data, a dynamically-determined capacity of the network, a predetermined importance of each of the periodically-updated information items and a dynamically-determined update rate of each of the periodically-updated information items.

6. The method of claim 5, wherein the dynamically-determined total update rate, the dynamically-determined capacity and the dynamically-determined update rate of each of the periodically-updated information items are dynamically determined at least every predetermined time interval.

7. The method of claim 1, further including:
   dispersing, following the distributing step, selected periodically-updated information items on the network.

8. The method of claim 1, further comprising, during the distributing step, distributing the sampled data stream over a private network.

9. The method of claim 1, further comprising, during the distributing step, distributing the sampled data stream over a network.

10. The method of claim 1, further comprising, during the distributing step, distributing the sampled data stream over a public network.

11. The method of claim 1, wherein the streaming data includes periodically-updated financial quote information items.

12. A method comprising:
receiving, by at least one processor, streaming data comprising periodically-updated information items from a streaming data source;
sampling, by the at least one processor, each of the periodically-updated information items of the received streaming data using a sampling process to select which of the information items from the received streaming data to distribute based on:
a dynamically-determined total update rate of the streaming data ($U_a$);
a dynamically-determined capacity of the network (C);
a predetermined importance ($K_{qmin}$) of each of the periodically-updated information items, each periodically-updated information item's predetermined importance being used with the dynamically-determined capacity of the network to determine a sampling rate threshold; and
a dynamically-determined update rate ($U_q$) of each of the periodically-updated information items, to create a sampled data stream;
the sampling process selects a periodic update of an information item in accordance with the information item's sampling rate threshold; and
distributing the sampled data stream on the network.

13. The method of claim 12, wherein the streaming data includes periodically-updated financial quote information items.

14. The method of claim 12, wherein the total update rate, the capacity and the dynamically-determined update rate of each of the periodically-updated information items are dynamically determined at least every predetermined time interval.

15. The method of claim 12, wherein the predetermined importance ($K_{qmin}$) of each of the periodically-updated information items is dynamically determined based on the capacity of the network into which the data is to be distributed.

16. The method of claim 12, further comprising, during the distributing step, distributing the sampled data stream over a private network.

17. The method of claim 12, further comprising, during the distributing step, distributing the sampled data stream over a network.

18. The method of claim 12, further comprising, during the distributing step, distributing the sampled data stream over a public network.

19. A method comprising:
receiving, by at least one processor, streaming data comprising periodically-updated information items from a streaming data source;
sampling, by the at least one processor, the received streaming data using a sampling process to select which of the information items from the received streaming data to distribute based on update rates of the information items and on a capacity of a network into which the data is to be distributed, to create a sampled data stream comprising selected information items;
distributing, by the at least one processor, the sampled data stream on the network;
determining, by the at least one processor and over a sweep interval, if any of the periodically-updated information items were updated by the streaming data but not sampled and distributed; and
independent of at least one sampling process that would have otherwise excluded the distribution of the information item for the sweep interval, distributing, by the at least one processor, the determined information items on the network.

20. Computer-readable non-transitory storage medium for tangibly storing thereon computer-readable program code to:
receive streaming data from a streaming data source;
sample the received streaming data using a sampling process to select which of the information items of the received streaming data to distribute based on one or more update rates of information items and on a capacity of the network into which the data is to be distributed, the sampling process selecting periodic updates of the information items to create a sampled data stream comprising the selected periodic updates of the information items, for each information item, the sampling process determines at least one sampling rate threshold in accordance with the capacity of the network and selects a periodic update of the information item using the at least one sampling rate threshold; and
distribute the sampled data stream on the network.

21. A computer-readable non-transitory storage medium for tangibly storing thereon program code to:
receive streaming data which includes periodically-updated information items from a streaming data source;
sampling each of the periodically-updated information items of the received streaming data using a sampling process to select which of the information items from the received streaming data to distribute based on:
a total update rate of the streaming data ($U_a$);
a capacity of the network (C);
a predetermined importance ($K_{qmin}$) of each of the periodically-updated information items, each periodically-updated information item's predetermined importance being used with the dynamically-determined capacity of the network to determine a sampling rate threshold; and
an update rate ($U_q$) of each of the periodically-updated information items;
the sampling process selects a periodic update of an information item in accordance with the information item's sampling rate threshold; and
distribute the sampled data stream on the network.

22. The computer-readable non-transitory storage medium of claim 21, the program code further comprising code to:
determine, over a sweep interval, if any of the periodically-updated information items were updated by the streaming data but not sampled and distributed; and
distribute on the network the information items determined in the step of determining, independent of the sampling process that would have otherwise excluded the distribution of the information item for the sweep interval.

23. A computer-readable non-transitory storage medium for tangibly storing thereon program code to:
receive streaming data which includes periodically-updated information items from a streaming data source;
sample the periodically-updated information items of the streaming data using at least one sampling process to select which of the information items received from the streaming data source to distribute based at least in part on one or more update rates of the information items of the streaming data and on a capacity of the network into which the data is to be distributed to create a sampled data stream;

distribute the sampled data stream on the network;

determine, over a sweep interval, if any of the periodically-updated information items were updated by the streaming data but not sampled and distributed; and distribute on the network the information items determined to have been updated by the streaming data but not yet sampled and distributed, independent of the at least one sampling process that would have otherwise excluded the distribution of the information item for the sweep interval.

24. A computer-readable non-transitory storage medium for tangibly storing thereon program code to:

receive streaming data which includes periodically-updated information items from a streaming data source;

sample each of the periodically-updated information items of the streaming data to create a sampled data stream using a sampling process to select which of the information items received from the streaming data source to distribute based on:
- a dynamically-determined total update rate of the streaming data ($U_a$);
- a dynamically-determined capacity of a network (C);
- a predetermined importance ($K_{qmin}$) of each of the periodically-updated information items; and
- a dynamically-determined update rate ($U_q$) of each of the periodically-updated information items;

distribute the sampled data stream on the network;

determine, over a sweep interval, if any of the periodically-updated information items were updated by the streaming data but not sampled and distributed; and distribute on the network the information items determined to have been updated by the streaming data but not sampled and distributed, independent of the sampling process that would have otherwise excluded the distribution of the information item for the sweep interval.

* * * * *